United States Patent
Dutch et al.

(10) Patent No.: US 10,176,051 B2
(45) Date of Patent: *Jan. 8, 2019

(54) POST BACKUP CATALOGS

(71) Applicant: EMC IP Holding Company LLC, Hopkinton, MA (US)

(72) Inventors: Michael John Dutch, Los Gatos, CA (US); Christopher Hercules Claudatos, San Jose, CA (US); Mandavilli Navneeth Rao, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 166 days.

This patent is subject to a terminal disclaimer.

(21) Appl. No.: 15/210,789

(22) Filed: Jul. 14, 2016

(65) Prior Publication Data

US 2016/0321141 A1 Nov. 3, 2016

Related U.S. Application Data

(63) Continuation of application No. 14/572,457, filed on Dec. 16, 2014, now Pat. No. 9,417,966, which is a continuation of application No. 13/631,633, filed on Sep. 28, 2012, now Pat. No. 8,943,356, which is a continuation-in-part of application No. 12/895,836, filed on Sep. 30, 2010, now Pat. No. 8,504,870.

(51) Int. Cl.
*G06F 11/00* (2006.01)
*G06F 11/14* (2006.01)
*G06F 17/30* (2006.01)

(52) U.S. Cl.
CPC ...... *G06F 11/1451* (2013.01); *G06F 11/1469* (2013.01); *G06F 17/30082* (2013.01); *G06F 11/1453* (2013.01); *G06F 2201/80* (2013.01); *G06F 2201/805* (2013.01)

(58) Field of Classification Search
CPC ................................................. G06F 11/1451
USPC .......... 714/6.1, 6.12, 6.13, 6.3, 2, 15, 16, 20
See application file for complete search history.

(56) References Cited

U.S. PATENT DOCUMENTS

| | | | |
|---|---|---|---|
| 4,974,156 A * | 11/1990 | Harding | G06F 12/08 707/E17.037 |
| 6,185,699 B1 * | 2/2001 | Haderle | G06F 9/466 714/19 |
| 7,496,783 B1 * | 2/2009 | Graf | G06F 11/1456 714/13 |

(Continued)

*Primary Examiner* — Dieu Minh T Le
(74) *Attorney, Agent, or Firm* — Van Pelt, Yi & James LLP (57) ABSTRACT

A method, article of manufacture, and apparatus for processing data. In some embodiments, this includes analyzing a first container at a block level, determining a first level of granularity based on the analysis of the first container, based on the first level of granularity, identifying a first set of data objects, storing metadata of the first set of data objects in a recovery catalog, based on the first set of data objects, identifying a second container, analyzing the second container at a block level, determining a second level of granularity based on the analysis of the second container, based on the second level of granularity, identifying a second set of data objects, storing metadata of the second set of data objects in the recovery catalog, wherein the recovery catalog is stored in a storage device.

21 Claims, 7 Drawing Sheets

(56) References Cited

U.S. PATENT DOCUMENTS

| | | | | |
|---|---|---|---|---|
| 2004/0030954 A1* | 2/2004 | Loaiza | .............. | G06F 17/30368 714/20 |
| 2007/0100913 A1* | 5/2007 | Sumner | ............... | G06F 11/1453 |
| 2008/0281865 A1* | 11/2008 | Price | ................. | G06F 17/30362 |

* cited by examiner

POST BACKUP CATALOGS

CROSS REFERENCE TO OTHER APPLICATIONS

This application is a continuation of co-pending U.S. patent application Ser. No. 14/572,457, entitled POST BACKUP CATALOGS filed Dec. 16, 2014 which is incorporated herein by reference for all purposes, which is a continuation of U.S. patent application Ser. No. 13/631,633, now U.S. Pat. No. 8,943,356, entitled POST BACKUP CATALOGS filed Sep. 28, 2012 which is incorporated herein by reference for all purposes, which is a continuation in part of U.S. patent application Ser. No. 12/895,836, now U.S. Pat. No. 8,504,870, entitled OPTIMIZED RECOVERY filed Sep. 30, 2010 which is incorporated herein by reference for all purposes.

FIELD OF THE INVENTION

The present invention relates generally to data systems, and more particularly, to systems and methods of efficiently protecting and accessing data.

BACKGROUND OF THE INVENTION

Conventional data recovery technologies emphasize backup and storage. These include making a copy of data and storing the copy version at a different location from the original version. This creates an inefficient use of data since two copies of data are retained.

There have been several advancements in backup and storage technology. One such advancement is deduplication. Deduplication removes redundant data blocks so that only one instance of the data block is stored. This can save potentially massive amounts of storage space, as well as bandwidth when transferring data from a backup client to a backup server.

Though such advancements in backup and storage have led to some increased efficiency, much of the efficiency is lost when recovering the data. For example, when recovering from deduplicated data, the data is reconstituted first and then sent to the recovery target. The recovery process requires much more bandwidth resources than the backup process.

Further, conventional data recovery technologies restore data in the format it was backed up in. If a user desired data in a different format, or just a portion of the data, the user would have to first restore the entire data set before formatting or selecting the desired portions. Similarly, resources are spent generating a backup catalog for files which may never be restored.

There is a need, therefore, for an improved method, article of manufacture, and apparatus for recovering data in data systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
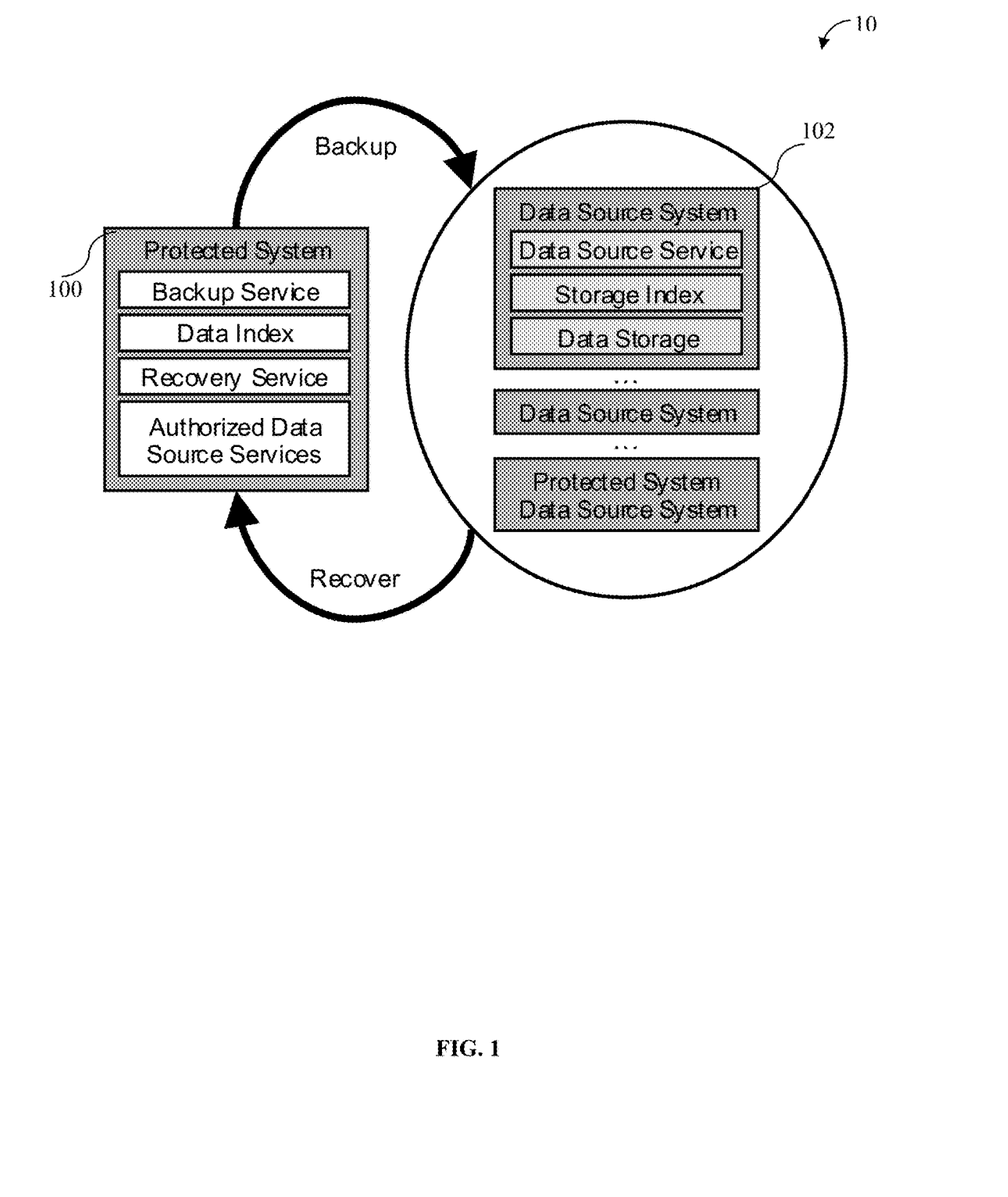
FIG. 1 is a diagram of a data system in accordance with some embodiments.

FIG. 1 illustrates a data system in accordance with some embodiments of the present invention. Data System 10 includes a Protected System 100, and a Data Source System 102. As illustrated by FIG. 1, there may be multiple Data Source Systems for the Protected System to recover from. Further, the Protected System may be a Data Source System for itself. Though FIG. 1 illustrates a "Backup" arrow from the Protected System 100 to Data Source System 102, it should be noted that a backup is not required in some embodiments.

In some embodiments, Protected System 100 includes a Backup Service, a Data Index, a Recovery Service, and an Authorized Data Services. A backup service performs back ups for the protected system when requested. These backup requests may be ad hoc, or may be scheduled. For example, a backup service may take an image of a hard drive in the protected system every two weeks. In some embodiments, the backup service may determine which data will be sent to the backup repository (e.g. duplicate files should not be sent again, certain data should not be sent according to policy, etc.), and may provide information necessary to construct a data index (e.g. hashes of objects, names of objects, etc.) The backup service may also provide deduplication and other space saving functions. For example, a backup service may segment each file or data object into data segments, and may create a hash of each file and each data segment. In some embodiments, deduplication may be performed on the target storage device, (e.g. may be a data source system), and accordingly, the information necessary to construct a data index (e.g. hash values) may be provided by the target storage device.

When connecting a protected system to a data source system, the backup service may be responsible for authenticating the identity of each data source system that the backup service communicates with. In some embodiments, the data source system may be responsible for such authentication.

In some embodiments, the data index is created by a backup service, or by another service which manages the data index for one or more protected systems. The data index may include a list of data index entries. Each entry may include information about an object, such as file name, file location, version metadata when backed up (e.g. using a backup application version 1.0), and a hash of the object, among others. In some embodiments the hash of the object may be determined by using a cryptograph hash function. In some embodiments, a data index entry may also include information on a sub level. For example, the data index entry may include information about an object's segment, the segment's segment number (e.g. segment 1 of 10), and a hash of the segment, among others. By having a data index, the protected system will have access to what hashes are necessary to reconstitute files.

It should be noted that although FIG. 1 depicts the backup service, data index, recovery service, and authorized data source services in Protected System 100, such components may reside outside of Protected System 100. For example, a protected system may be a desktop computer, and the data index may reside in a remote location. The data index may, in some embodiments, reside in a data source system. Further, Protected System 100 need not be limited to a single machine. Protected System 100 may, in some embodiments, comprise several different desktops, each desktop with its own data index, or there may be a master data index covering all desktops stored in a remote location. There are many ways to arrange the components without diverging from the spirit of the invention.

In some embodiments, a recovery service maintains a list of authorized data source services that may be used to provide data matching a hash. Data source services may be added to the list through a variety of methods. In some embodiments, a data source service may be added (authorized) by having the backup service use the data source system as a backup target. In some embodiments, data source services may be added or removed based on configuration settings or dynamic notifications from newly discovered data source services.

A recovery service may be responsible for authenticating the identity of each data source it communicates with. In some embodiments, the data source may be responsible for authenticating the identity of the protected system or recovery service attempting to recover data from the data source. Having the data source authenticate may be preferable to prevent spam recovery requests (e.g. a rogue system randomly sending out hashes to recover data).

Once a data recovery request is received, the recovery service may validate that the request is authorized to recover the specific data. Many users may have access to the same physical computer, but different users may have different access privileges. For example, IT staff may have administrative rights and have access to every file, while guess users may only have access to certain files. In some embodiments, the recovery service would check to see if a user requesting recovery of a file has the rights to access the file in the first place.

In some embodiments, after the recovery request is validated, the names and version metadata may be used to lookup the hash value of the file contents in the data index. In some embodiments, search capability may be utilized to enhance the efficiency recovery process. The search may include a search by name, location, content, system metadata, user metadata, among others. The user may then select one or more files from the search results to begin recovery. Search results need not be limited to files. For example, data segments may be listed and returned if requested.

If a desired file and file version (e.g. win32.dll final version) is not in the data index, it may still be possible to recover the file and file version if a hash value for the desired file's contents can be determined by an alternative hash determination. In some embodiments, an alternative hash determination may include using additional data indices, such as those in "golden" system images. In some embodiments, an alternative hash determination may include requesting a data source return a list of hashes for all objects stored in a container identified by a hash. In this way, common files that reside on multiple systems (such as Windows system files) may be recovered without additional back ups.

During the recovery process, it may be preferable to recover data from local data sources in some embodiments. This may result in significant bandwidth savings. In some embodiments, if a local data source service is available, it requests the location of the file by hash value. If a matching location is returned, recovery is completed with little data transfer. If no file hash match is found, the recovery service may request the location of data segments by hash value to satisfy a recovery request. For example, suppose File A has segments 1, 2, and 3, File B has segments 2, 3, 4, and File C has segments 1, 2, and 4. If a user requested a recovery of C, but there was no record of File C's hash in a data index, the recovery service could look for the hashes of File C's segments. If File A and File B were in the data index, the recovery process would be able to locate segments 1, 2, 3, and 4, which are sufficient to reconstitute File C (e.g. segments 1, 2, and 4). In this way, even though a record of File C's hash was not in the data index, File C would be recoverable based on File C's segments. Local recovery may be particularly desirable for mobile devices, or other devices with low bandwidth or intermittent connectivity.

In some embodiments, it may be preferable to utilize a remote data resource (e.g. requiring a network connection to connect to the data source). Multiple remote data resources may have the requested file. In such cases, the recovery service may prioritize the data sources according to a variety of factors, such as geographical distance, data formats, transfer protocols, bandwidth considerations, performance statistics, policy settings, and resource constraints, among others. For example, if a protected system in Country X discovered that a remote data source in Country Y had a requested file, the differing laws in the two countries may affect the desirability of the protected system to connect to the remote data source in Country.

Several methods may be used to issue recovery requests to remote data sources. For example, one approach includes issuing all recovery requests to the "best" remote data source (e.g. closest, highest resources, etc.). In some embodiments, recovery requests may be distributed across data sources to balance resource utilization. A peer to peer communication protocol such as BitTorrent may be used to transfer data from multiple remote data sources.

The data source service is provided for each storage system or computer system from which data may be used to satisfy a data recovery request. A data source service may be provided for computer systems that may or may not be protected systems (e.g. systems that have not performed a backup, among others). In some embodiments, the data source service may be responsible for authenticating the identity of each backup service and recovery service that it communicates with and ensuring that all such communications are authorized. Data source services that provide data from cloud service providers have to ensure that privacy and other aspects of multi-tenancy (e.g. several users accessing the same "cloud") are satisfied. The data source service may in some embodiments provide transformation services. Transformation services may include allowing data stored in one format to be presented in another format. For example, data stored as a disk image may be presented as one or more files. Similarly, data stored as a set of files may be presented as a disk image. This may be desirable when migrating between different operating environments (e.g. Windows to Linux, physical to virtual systems, etc.).

Once a backup has completed, a user may parse the backup any time after the backup to look for more granular data inside the backup. In some embodiments, this may include looking at the block level to determine what file system was backed up. File systems have their own "fingerprint." For example, file system A may always include a AF19FA27 identifier followed by X bits of 0, while file system B may always include a 2F94 998D identifier followed by Y bits of 1. If either of these patterns is detected, it can be determined that the backup or image file includes either file system A or file system B.

After determining a file system, or one level of granularity, further examining the blocks may reveal another level of granularity. For example, once a Windows file system has been determined, looking further at the blocks may reveal file type and location information. For example, blocks with pattern 1 may indicate file type .doc, while blocks with pattern 2 may indicate file type .xls. File system information may also be used to determine metadata for files (e.g. windows file systems always have metadata pattern Y for files, while linux systems always have metadata pattern Z for files.) Such information may be used to find the start and end blocks of files, etc.

Cataloguing can be even more granular in some embodiments. For example, suppose a catalog of a windows file machine lists every file. Some files may be .zip files. These zip files may contain several other files, and may include several file types, such as .doc, .jpg, .mpg, etc. If the format of .zip files is known, the zip file may be parsed in a process similar to how a volume backup may be parsed. In this manner, files or backup images may be considered containers. An image contains several files, and the files themselves may contain several other files. Though the term file is used, it should be understood that "file" is not limited to documents. Files may include .vmdk files, which itself may include a virtual file system. As long as the format of the container is understood, the container can be parsed for further granularity. This decouples the conventional notion that a volume backup must lead to a volume restore, and a file level backup must lead to a file level restore.

By examining the data at a block level, the cataloging process is no longer limited by the backup application. As long as the format of containers is understood as described above, the catalog need not be generated by the backup application. In fact, it may be preferable in some embodiments that the backup application not generate the catalog.

Conventionally, only the backup application could create a catalog of the backup it creates, and the backup application typically creates the catalog while backing up the data. Cataloging can be a resource intensive process, especially when a backup application needs to backup a considerable number of data objects. Using the enhanced techniques described herein, a backup application no longer needs to catalog while performing the backup. The backup application simply stores the data to a backup repository. This may free up considerable processing resources since the backup application doesn't need to keep track of all the data objects it is backing up, and may lead to faster backup operations.

Catalogs may be generated at any time after the backup application, and in some embodiments, may be generated on demand. For example, suppose a corporation has received an ediscovery request for all spreadsheets relating to Q3 2012 financial activities. If the corporation maintained corporate-wide monthly backups, conventional restore processes would use the backup application to restore all monthly backups in Q3 2012. This may result in a lot of information being restored that is not necessary (e.g. file types of any other than spreadsheets). Using the enhanced techniques described herein, the monthly backups in Q3 may be parsed to look for all spreadsheet files. That is, the backups may be parsed on a block level to first identify a file system, and then using the information from the file system, searched for spreadsheet files. Not only does this save time on the backup portion (e.g. not having to generate a catalog when backing up), but this may save considerable time on the restore portion (e.g. not having to restore every file). By allowing users to determine when to create the catalog and what to include in the catalog, catalogs may contain less unneeded information, and resources may be more efficiently utilized.

In some embodiments, the catalog may be presented to the user via an application programming interface (API), or a user interface of an application written to parse backup data in a manner described herein. For example, the catalog may be stored in a format that is native to the backup application, and the native backup application may be accessed via an API.

In some embodiments, transformations may be generated, indexed, and stored prior to receiving requests for transformed data objects. In some embodiments, transformation, indexing, and presentation of the transformed data may be performed on demand.

In some embodiments, data source services create and maintain a storage index for the data storage in which it may use to satisfy a data recovery request. Entries in the storage index are maintained for each data object that is to be presented. For example, if a virtual machine image is synthesized from file level backups, entries for the virtual machine image or segments within the virtual machine image may be created within the storage index.

The data source service may also determine the expense of transferring data its data source service. Such information may include the location (e.g. geographical position) of the source data, the format of the data, and the amount of data matching a hash.

A storage index is created for each data source service that may be used to satisfy a data recovery request. The storage index may be a set of entries, wherein each entry may include the length of the content, hash, locator (such as an identifier or address), a count (list size) and list of hashes of the files sharing the same content.

Data storage includes backup repositories, public cloud storage, networked storage, direct-attached storage, and internal storage systems.

By utilizing the enhanced techniques described herein, the efficiency of restore operations may be increased. For example, during a recovery operation, the recovery service may indicate that it only 100 segments of data to recover all the requested data. The data source service may then send only the 100 segments to the protected system. This may potentially realize large savings in bandwidth consumption. To illustrate, suppose the requested data is 1000 files. Many of the files may have many segments in common (e.g. two files have 90 segments in common). Instead of the backup repository sending 1000 files (which share many common segments) over the network, the backup repository only sends 100 segments.

In some embodiments, a combination of recovery techniques may be used to recover data. For example, consider the following files and their respective segments:
File X: 1, 6, 9, 10
File A: 1, 2, 3, 4
File B: 5, 6, 7, 8
File C: 9, 10, 11, 12

As shown above, Segments 1, 6, 9 and 10 are required to reconstitute File X. Suppose a client wishes to recover File X, but has not actually backed up File X. Further suppose File A, B, and C each reside in a different remote resource (e.g. different clients of a backup server, or the backup server itself). Further suppose that the client has Segment 10, and that the client is capable of supporting sharing blocks between files (e.g. two blocks may share one block). In some embodiments, Segment 10 may be part of another file on the client, or may be part of a "deleted" file (e.g. the pointers are removed, but the actual data still resides on the client). A combination of recovery techniques may begin with local recovery. Using local recovery, as described herein, Segment 10 would be recoverable without resorting to remote resources. Remote recovery, as described herein, may be used next. Segment 1 may be recovered from File A on a remote resource (e.g. another client). Segment 6 may be recovered from File B on a different remote resource (e.g. yet another client). Segment 9 may be recovered from File C on a different remote resource (e.g. a backup server). Combining Segments 1 from File A, 6 from File B, 9 from File C, and 10 from the client, File X may be reconstituted, or recovered, even though there is no available copy of File X.

It should be noted that combining recovery techniques need not be limited to cases in which a copy of a file is unavailable. For example, consider the following files and their respective segments:
File X: 1, 6, 9, 10
File A: 1, 2, 3, 4
File B: 5, 6, 7, 8

Suppose a client wishes to recover File X, and has backed up File X to a backup server. Further suppose File A and B each reside in a different remote resource (e.g. different clients of a backup server). Further suppose that the client has Segment 10. In some embodiments, Segment 10 may be part of another file on the client, or may be part of a "deleted" file (e.g. the pointers are removed, but the actual data still resides on the client). As described above, Segment 10 may be recovered using local recovery. Segments 1 and 6 may be recovered from the backup server, but it may not be preferable to do so in some embodiments. For example, the backup server may be experiencing a heavy load, and it may be preferable for the client to recover Segments 1 and 6 from other clients with Files A and B using remote recovery as described herein. By using a combination of recovery techniques as a single method (e.g. the single methods includes some or all of the recovery techniques), the backup server need only send Segment 9, instead of every segment. There is no need to for a user to select one recovery method, follow up with another recovery method, etc. The combination seems transparent to the user.

It may be preferable to combine recovery techniques into a single user interface. For example, instead of using one application to perform local recovery, another application to perform remote recovery from other clients, and another application to recover from a backup server, a single application may be used to make the separate recovery operations transparent to the user. In some embodiments, hash representations of the object may be recovered from a local resource and a remote resource. Once all the hashes have been brought together, the object may be reconstituted.

Figure 2:
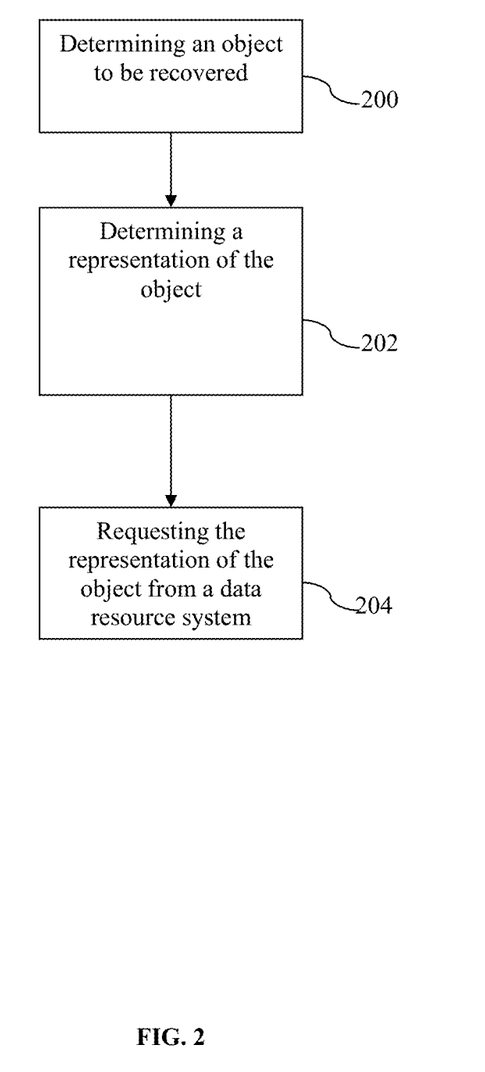
FIG. 2 is a flowchart of a method to backup data in accordance with some embodiments.

FIG. 2 illustrates a method to enhance recovery in accordance with some embodiments. In step 200, an object to be recovered is determined. In step 202, a representation of the object is determined. In some embodiments, the representation may be a hash value or may be a segment of the object. In step 204, the representation of the object is requested from a data resource system.

Figure 3:
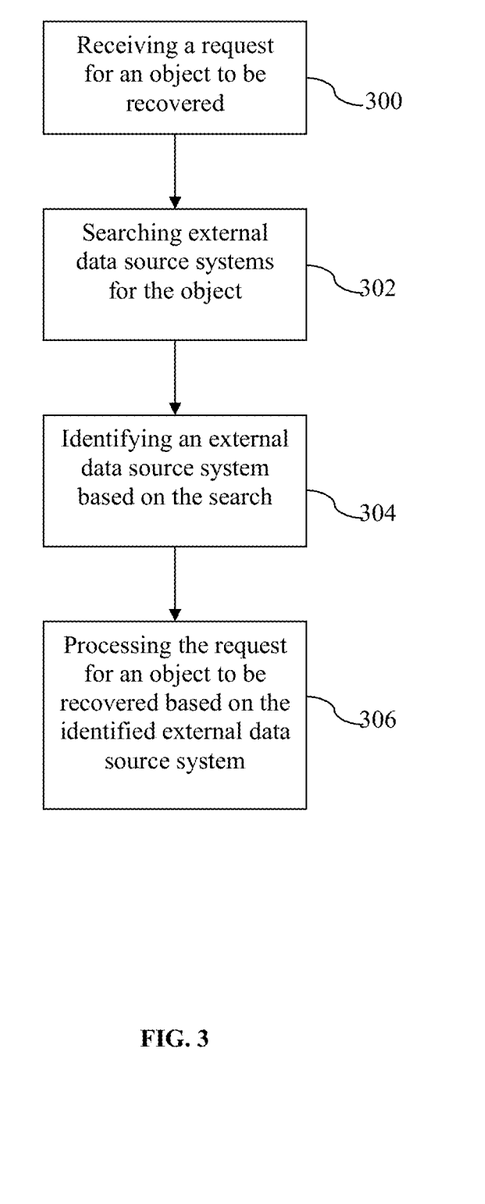
FIG. 3 is a flowchart of a method to recover data in accordance with some embodiments.

FIG. 3 illustrates a method to enhance recovery in accordance with some embodiments. In step 300, a request for an object to be recovered is received. In step 302, external data sources are searched for the object (e.g. data sources external to the data source that initially received the request for recovery). In step 304, an external data source system is identified based on the search. In step 306, the request for an object to be recovered is processed based on the identified external data system.

Figure 4:
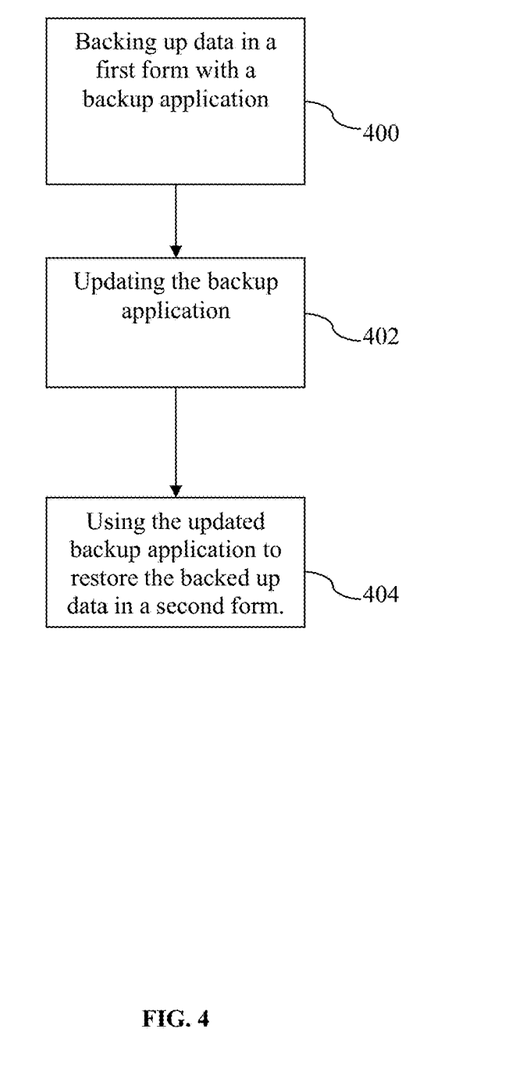
FIG. 4 is a flowchart of a method to access data in accordance with some embodiments.

FIG. 4 illustrates a method to recover data in accordance with some embodiments. In step 400, data is backed up in a first form with a backup application. In step 402, the backup application is updated. In step 404, the updated backup application is used to restore the backed up data in a second form. For example, the first form may be a copy of a Microsoft Exchange server, and the second form may be individual emails.

Figure 5:
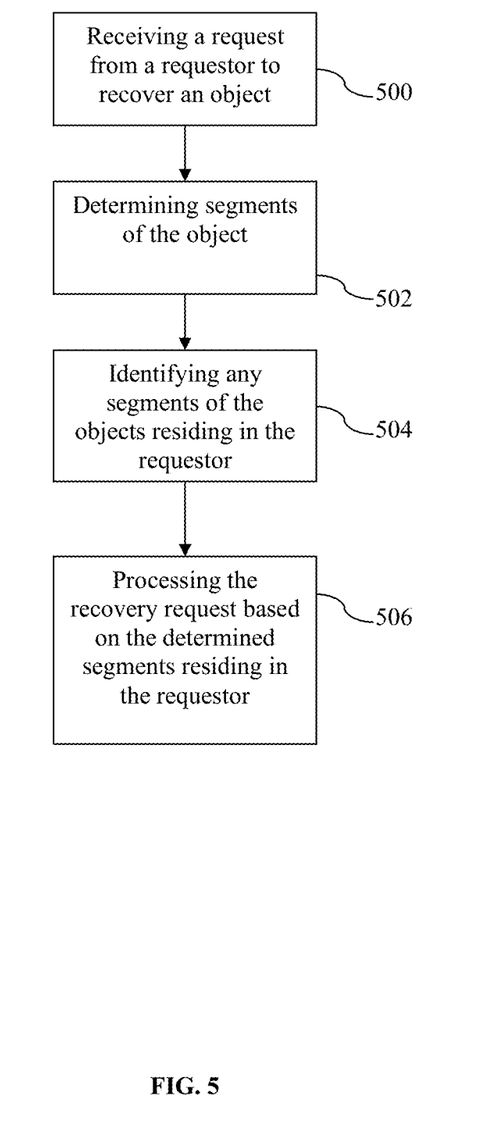
FIG. 5 is a flowchart of a method to preserve data in accordance with some embodiments.

FIG. 5 illustrates a method to recover data in accordance with some embodiments. In step 500, a request to recover an object is received from a requestor (e.g. a protected system). In step 502, segments of the object are determined. In step 504, segments of the objects residing in the requestor are identified. In step 506, the recovery request is processed based on the determined segments residing in the requestor.

Figure 6:
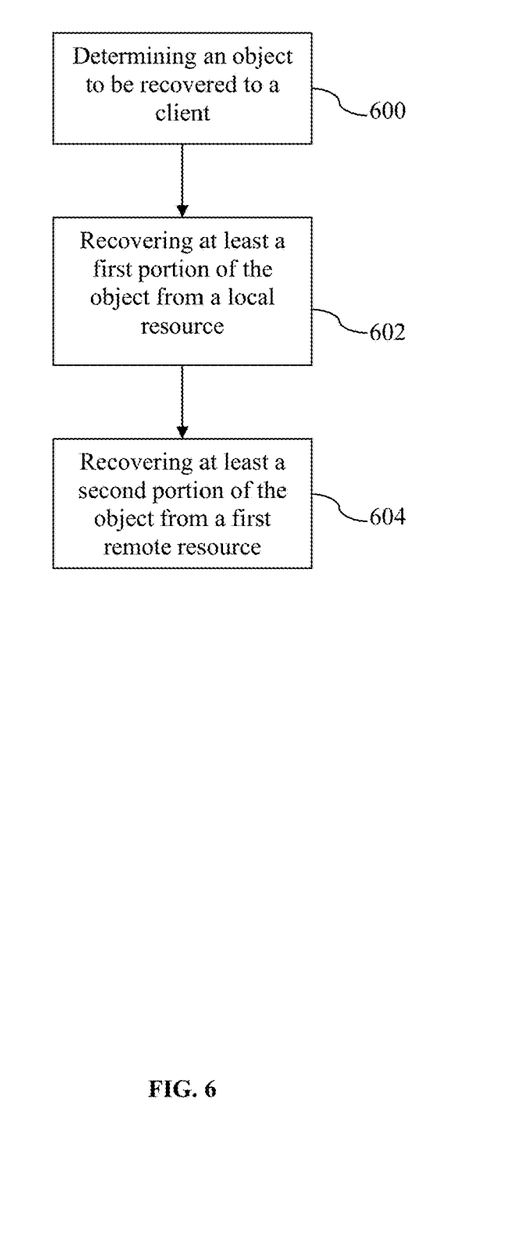
FIG. 6 illustrates a method to recover data in accordance with some embodiments.

FIG. 6 illustrates a method to recover data in accordance with some embodiments. In step 600, an object to be recovered to a client is determined. In step 602, at least a first portion of the object is recovered from a local resource. In step 604, at least a second portion of the object is recovered from a first remote resource. In some embodiments, a third portion of the object may be recovered from a second remote resource. For example, a client may recover a portion of the object via local recovery (e.g. undelete some blocks), recover another portion from a first remote resource (e.g. other clients or peers), and recover another portion from a second remote resource (e.g. a backup server with a full backup of the object, but it did not have the bandwidth to send over the full copy of the object.).

Figure 7:
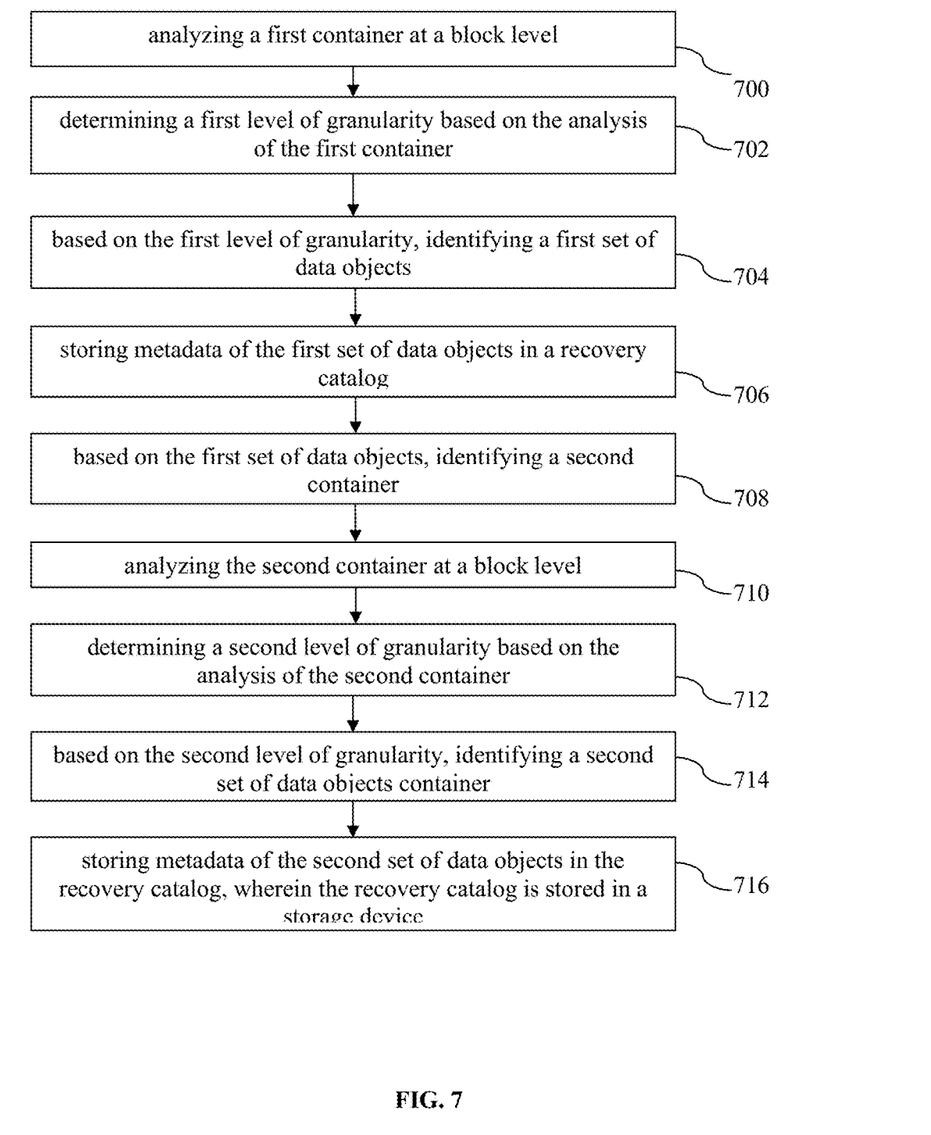
FIG. 7 illustrates a method to process data in accordance with some embodiments.

FIG. 7 illustrates a method to process data in accordance with some embodiments. In step 700, a first container is analyzed at a block level. In step 702, a first level of granularity is determined based on the analysis of the first container. In step 704, a first set of data objects is identified based on the first level of granularity. In step 706, metadata of the first set of data objects is stored in a recovery catalog. In step 708, a second container is identified based on the first set of data objects. In step 710, the second container is analyzed at a block level. In step 712, a second level of granularity is determined based on the analysis of the second container. In step 714, a second set of data objects is identified based on the second level of granularity. In step 716, metadata of the second set of data objects is stored in the recovery catalog, wherein the recovery catalog is stored in a storage device.

In some embodiments, the first level of granularity may include a file system. The first container may be backup data created by a backup application, such as a backup image file. The first container may be a virtual machine disk file in some embodiments.

After identifying a level of granularity, a file list may be created by further examining the container at a block level. For example, after identifying a Windows file system, a list of files in the C:\ directory may be identified and stored in a recovery catalog.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing data, comprising:
   obtaining, by one or more processors, an indication to catalog one or more backup images;
   in response to obtaining the indication to catalog the one or more backup images,
      analyzing, by one or more processors, one or more backup images at a block level;
      determining, by one or more processors, one or more corresponding levels of granularity based at least in part on the analysis of the one or more backup images;
      identifying, by one or more processors, one or more sets of data objects corresponding to the one or more backup images based at least in part on the one or more corresponding levels; and
      storing, by one or more processors, metadata of the one or more sets of data objects in a recovery catalog, wherein the recovery catalog is stored in a storage device; and
   performing a recovery of at least one of the one or more of the backup images, the performing the recovery comprising:
      synthetizing a recovery backup image based at least in part on a set of data corresponding to a first one of the one or more backup images and a set of data corresponding to a second one of the one or more backup images,
      wherein a file comprised in the recovery backup image comprises at least a segment recovered from the set of data corresponding to the first one of the one or more backup images and a segment recovered from the set of data corresponding to the second one of the one or more backup images.

2. The method of claim 1, wherein the one or more corresponding levels of granularity includes one or more file systems.

3. The method of claim 1, wherein a file type of a first data object included in one or more sets of data objects corresponds to a .zip file.

4. The method of claim 1, wherein the one or more backup images includes backup data created by a backup application.

5. The method of claim 1, wherein at least one of the one or more backup images is identified based at least in part on one or more data objects associated with a different backup image.

6. The method of claim 1, wherein at least one of the corresponding levels of granularity is determined based at least in part on a fingerprint of a file system associated with the corresponding one or more backup images.

7. The method of claim 6, wherein the fingerprint is based at least in part on a pattern for objects associated with the corresponding one or more backup images.

8. A system for processing data, comprising a storage device, and one or more processors configured to:
   obtain an indication to catalog one or more backup images;
   in response to obtaining the indication to catalog the one or more backup images,
      analyze one or more backup images at a block level;
      determine one or more corresponding levels of granularity based at least in part on the analysis of the one or more backup images;
      identify one or more sets of data objects corresponding to the one or more backup images based at least in part on the one or more corresponding levels; and
      store metadata of the one or more sets of data objects in a recovery catalog, wherein the recovery catalog is stored in the storage device; and
   perform a recovery of at least one of the one or more of the backup images, to perform the recovery comprising:
      synthetize a recovery backup image based at least in part on a set of data corresponding to a first one of the one or more backup images and a set of data corresponding to a second one of the one or more backup images,
      wherein a file comprised in the recovery backup image comprises at least a segment recovered from the set of data corresponding to the first one of the one or more backup images and a segment recovered from the set of data corresponding to the second one of the one or more backup images.

9. The system of claim 8, wherein the one or more corresponding levels of granularity includes one or more file systems.

10. The system of claim 8, wherein a file type of a first data object included in said first set of data objects corresponds to a .zip file.

11. The system of claim 8, wherein the one or more backup images includes backup data created by a backup application.

12. The system of claim 8, wherein at least one of the one or more backup images is identified based at least in part on one or more data objects associated with a different backup image.

13. The system of claim 8, wherein at least one of the corresponding levels of granularity is determined based at least in part on a fingerprint of a file system associated with the corresponding one or more backup images.

14. The system of claim 13, wherein the fingerprint is based at least in part on a pattern for objects associated with the corresponding one or more backup images.

15. A computer program product for processing data, comprising a non-transitory computer usable medium having machine readable code embodied therein for:
   obtaining, by one or more processors, an indication to catalog one or more backup images;
   in response to obtaining the indication to catalog the one or more backup images,
      analyzing, by one or more processors, one or more backup images at a block level;
      determining, by one or more processors, one or more corresponding levels of granularity based at least in part on the analysis of the one or more backup images;
      identifying, by one or more processors, one or more sets of data objects corresponding to the one or more backup images based at least in part on the one or more corresponding levels; and
      storing, by one or more processors, metadata of the one or more sets of data objects in a recovery catalog, wherein the recovery catalog is stored in a storage device; and
   performing a recovery of at least one of the one or more of the backup images, the performing the recovery comprising:
      synthetizing a recovery backup image based at least in part on a set of data corresponding to a first one of the one or more backup images and a set of data corresponding to a second one of the one or more backup images,
      wherein a file comprised in the recovery backup image comprises at least a segment recovered from the set of data corresponding to the first one of the one or more backup images and a segment recovered from the set of data corresponding to the second one of the one or more backup images.

16. The computer program product of claim 15, wherein the one or more corresponding levels of granularity includes one or more file systems.

17. The computer program product of claim 15, wherein a file type of a first data object included in one or more sets of data objects corresponds to a .zip file.

18. The computer program product of claim 15, wherein the one or more backup images includes backup data created by a backup application.

19. The computer program product of claim 15, wherein at least one of the one or more backup images is identified based at least in part on one or more data objects associated with a different backup image.

20. The computer program product of claim 15, wherein at least one of the corresponding levels of granularity is determined based at least in part on a fingerprint of a file system associated with the corresponding one or more backup images.

21. The computer program product of claim 20, wherein the fingerprint is based at least in part on a pattern for objects associated with the corresponding one or more backup images.

* * * * *